United States Patent [19]

Lucero et al.

[11] Patent Number: 4,876,693
[45] Date of Patent: Oct. 24, 1989

[54] INTEGRATED LASER HEAD AND LOW INDUCTANCE PULSE FORMING CIRCUIT FOR PULSED GAS LASERS

[75] Inventors: David J. Lucero, Upland; Claudio G. Parazzoli, Pacific Palisades; Metin S. Mangir, Los Angeles, all of Calif.

[73] Assignee: Hughes Aircraft Company, Los Angeles, Calif.

[21] Appl. No.: 686,339

[22] Filed: Dec. 26, 1984

[51] Int. Cl.$^4$ .............................................. H01S 3/09
[52] U.S. Cl. ...................................... 372/82; 372/87; 313/356
[58] Field of Search .................... 330/4.3; 372/81, 82, 372/87, 88; 313/326, 356; 307/109

[56] References Cited

U.S. PATENT DOCUMENTS

| | | | |
|---|---|---|---|
| 3,659,225 | 4/1972 | Furumoto et al. | 372/82 |
| 3,828,277 | 8/1974 | Otto et al. | 372/82 |
| 3,970,956 | 7/1976 | Bolduc | 372/87 |
| 4,112,392 | 9/1978 | Andersson et al. | 372/88 |
| 4,201,953 | 5/1980 | Robbins | 372/82 |
| 4,237,430 | 12/1980 | Liu et al. | 372/87 |
| 4,630,277 | 12/1986 | Cirkel et al. | 372/83 |

Primary Examiner—Nelson Moskowitz
Attorney, Agent, or Firm—W. J. Streeter; W. K. Denson-Low

[57] ABSTRACT

Integrated laser head apparatus is disclosed for producing high energy pulses in pulsed gas lasers. The present invention provides high energy pulses over short time durations suitable for laser rangefinder systems due to an improvement of the arrangement of energy storage capacitors (22, 24) which keeps circuit inductance to a minimum. The pair of nested, ceramic capacitors (22, 24) are substantially cylindrical and are coupled through thin conductive layers (23). The capacitors are charged by a spark gap trigger (14), an inductor (18), and a charging resistor (52). The capacitors (22, 24) enclose a pressure vessel (28) which further encloses a laser resonator (12) including a laser output coupler mirror (42), totally reflective mirror (44), discharge electrodes (32, 34) and a central chamber (30) which contains a pressurized gaseous phase laser medium. The high voltage discharge electrode (32) is disposed coaxially with the surrounding capacitors (22, 24).

23 Claims, 3 Drawing Sheets

INTEGRATED LASER HEAD AND LOW INDUCTANCE PULSE FORMING CIRCUIT FOR PULSED GAS LASERS

BACKGROUND OF THE INVENTION

1. Field of the Invention

The present invention relates to lasers and, more specifically, to apparatus for obtaining high power pulses from gas lasers.

2. Description of the Technology

Laser rangefinder equipment is used to determine the distance from a rangefinder to a remote object. In order to maximize the resolving power of a laser rangefinder, such a system must be capable of generating pulses which contain relatively high levels of energy but which span only an extremely short interval of time. A desirable peak power level for such a system is in the 1 megawatt range. The total energy transmitted in one of these pulses should be in the neighborhood of 100 millijoules. The duration of such a pulse, measured at the one-half of peak amplitude power level, is approximately 60 nanoseconds. For optimum performance of rangefinders which employ shared aperature between the transmitter and the receiver, the total length of the pulses must be less than a microsecond i.e., in one microsecond or less from the occurrence of the peak, the power must decrease by a factor equal to $10^{-6}$.

The design constraints of weight, size, and volume further complicate the criteria which dictate the construction of the system. Such design constraints often require the active volume of such a laser rangefinder to be approximately from 15-20 cubic centimeters. $CO_2$ laser rangefinder which are currently available can typically produce pulses of 35-50 millijoules of energy over a time span of 2 microseconds. This 2 microsecond pulse length causes severe difficulties by degrading a rangefinder's capacity to accurately resolve distances.

The origin of this inability of a rangefinder to resolve pulses is related to the lack of sharpness of the shape of the output waveform. In comparison to the ideal high, narrow pulse shown in FIG. 1, FIG. 2 depicts an output pulse which contains less energy and is far less sharp or spiked. This lack of pulse definition often results in the inability of a rangefinder to distinguish between two closely separated targets. The secondary peaks which accompany the primary peak in the waveform shown in FIG. 2 makes such waveforms unsuitable for use in laser rangefinders.

One technique which has been employed to obtain higher power and sharper pulses is to increase the gas pressure of the laser gain medium. This method is used in a transverse electric laser in which the excitation energy is imposed upon a gas medium in a direction perpendicular to the optical axis of the laser cavity. Instead of maintaining a $CO_2$ mixture of carbon dioxide nitrogen and helium at 1 atmosphere, gas lasers may be operated at several multiples of 1 atmosphere in order to produce high energy and short time duration laser pulses.

One attempt to produce high output pulses is described in U.S. Pat. No. 4,185,255-Wittman, et al. That apparatus includes a pair of electrodes disposed in parallel fashion around a gas containing laser tube. A rather large generator unit is coupled to these electrodes and provides large amounts of energy in order to trigger the gas laser and thereby produce relatively high output pulses of several kilojoules. The problem with this apparatus is that it is incapable of producing output pulses of great magnitude which are required in order to produce a state of the art rangefinder. If the gas pressure within such a device is greatly increased, so that the $CO_2$ mixture is contained in the range of about 5 atmospheres, then the device is capable of producing the required power output. One problem created by increased operating gas pressure is unwanted arcing of electrical energy across the discharge electrodes which severly degrades the laser output energy. It is possible to decrease the probability of arcing by decreasing the inductance of the circuit which, in turn, reduces the electrical pulse width.

Another technique employed to produce more intense output pulses would be to use an electro-optic Q-switch. Such a method incorporates a suitable crystal, e.g., cadmium telluride, in order to control the laser pulse shape and energy. This method requires a great deal of additional equipment and a separate power supply, and is susceptible to crystal damage and misalignment caused by rough use.

It would be highly advantageous to develop an integrated laser head which is capable of generating extremely short, high energy output pulses. Such a solution would satisfy a long felt need manifested by the current efforts of the laser and optics industry which continues to develop communications and measurement systems which require reliable, durable, cost effective high output lasers. The continued development and manufacture of such high power output lasers has generated a concomitant demand for an invention suitable for use in a compact laser rangefinder which can produce 100 millijoules output pulses which have a pulse length of less than 1 microsecond. None of the prior devices provides an effective and inexpensive solution to this problem which is encountered in the rangefinder technology. Such an integrated laser head would ideally be suited to operate within a very small working volume, typically 15-20 cubic centimeters, so that it would be capable of being used in a variety of situations and environments. Such an integrated laser head would further be capable of being employed in a wide variety of military and civilian uses over a broad range of temperatures and pulse output rates.

SUMMARY OF THE INVENTION

The present invention overcomes and avoids the problems encountered in previous devices by using an ingenious design to increase power output levels without substantially increasing the input power supply. The solution embodied in the present invention provides for the lowest possible inductance in the discharge pathway for electrical current flowing from the storage capacitor of the integrated laser head to the discharge electrodes which initiate the laser light. This circuit inductance is minimized by keeping the distance from the energy storage medium to the discharge electrodes at an absolute minimum. The minimal inductance is accomplished by deploying storage capacitors in a substantially cylindrical or annular fashion around the discharge electrodes within the pressure vessel. The optimal, minimum inductance of the circuit is further achieved by centering the capacitors around one of the discharge electrodes. The capacitors themselves present little additional inductance to the circuit since they are coupled through the large area of metallized layers deposited on their outer and inner surfaces.

It is, therefore, an object of the present invention to provide for a new and highly advantageous approach to the conventional method for providing high energy laser pulses in a gas laser rangefinder.

Another object is to provide for an efficient and cost effective means of producing extremely short and spike like pulses using pulse gas lasers.

Yet another object of the invention is to provide for an integrated laser head which avoids the problems of premature arcing.

Other aims and objects, as well as a more complete understanding of the present invention, may be learned through the study of the following description of the preferred embodiment in addition to the accompanying drawings.

DESCRIPTION OF THE PREFERRED EMBODIMENT

Figure 5:
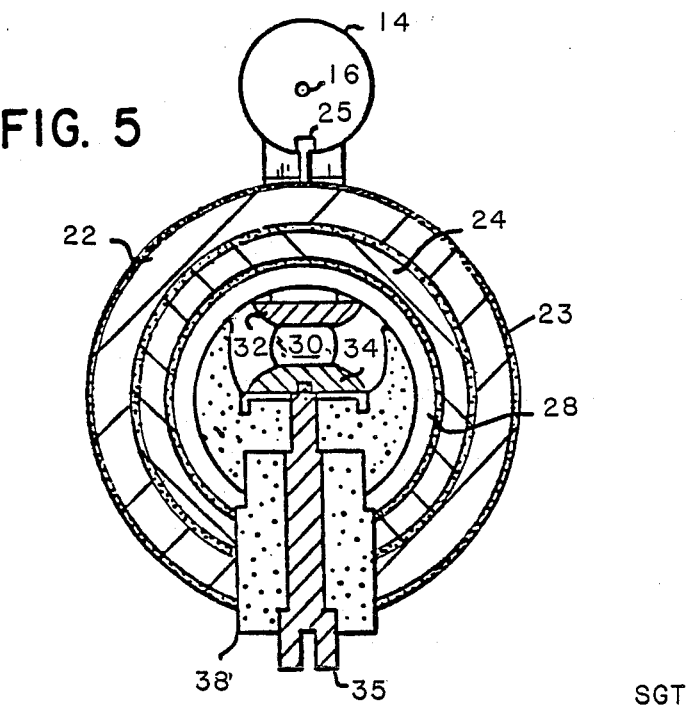
FIG. 5 is a cross-sectional view taken along line 5—5 of FIG. 4 depicting the present invention along its longitudinal axis.
Figure 3:
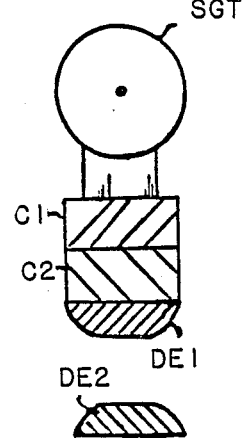
FIG. 3 is a schematic illustration of previous devices which deploy energy storage means C1 and C2 directly above and parallel to discharge electrodes DE1 and DE2 with a spark trigger SGT deployed directly above the energy storage means.
Figure 4:
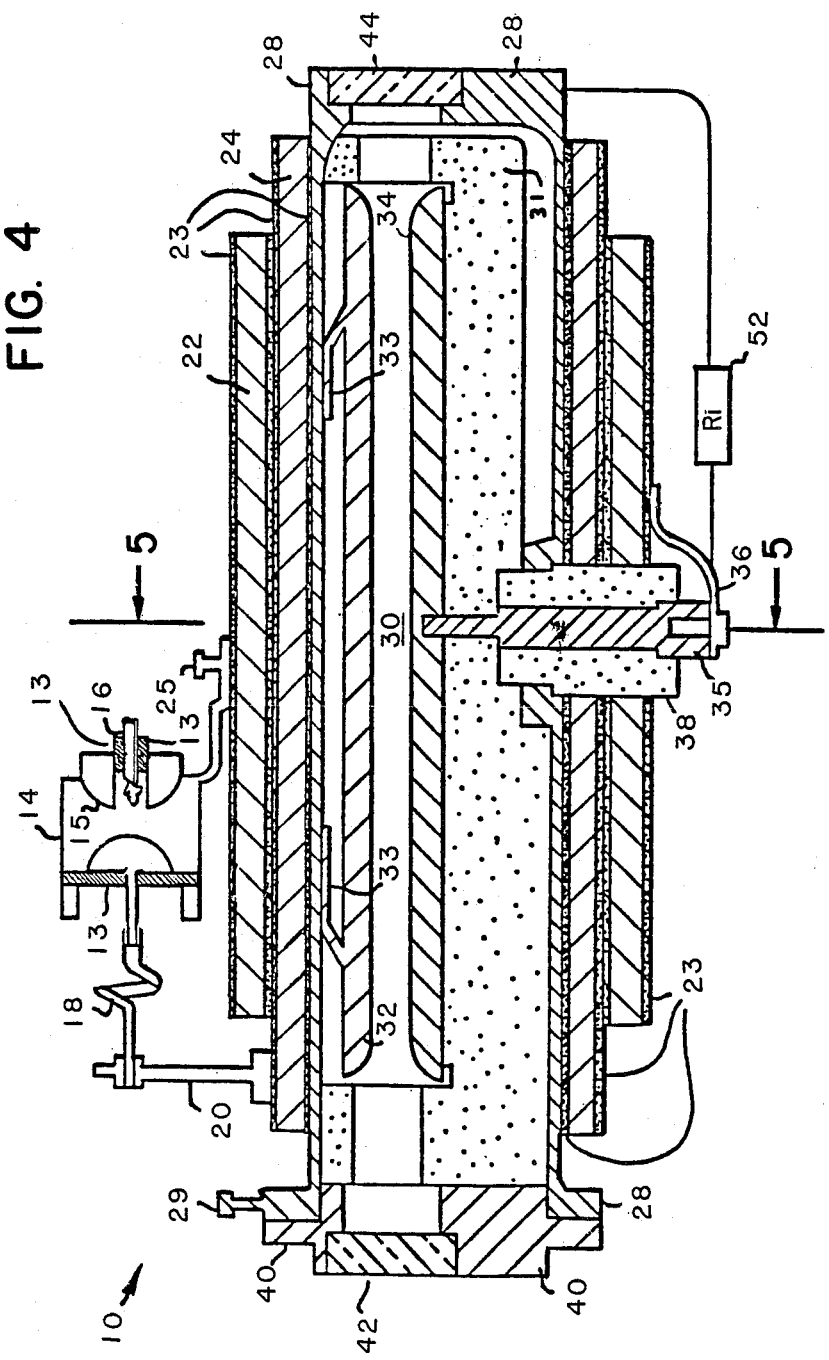
FIG. 4 is a cross-sectional view of the present invention shown transversely.

FIGS. 4 and 5 show the interior of the integrated laser head apparatus 10 including a resonator 12 depicting transverse and longitudinal cross-sectional views. A conventional spark gap trigger 14 containing spark gap discharge electrode 15 is coupled to an electrical input wire 16 at the top of the device for initiating the electrical discharge which commences the laser action. Below the spark gap trigger 14 reside outer and inner substantially cylindrical capacitors 22 and 24. These capacitors are manufactured from low inductance ceramic material and are plated with thin metallic layers 23 for storing large quantities of electrical energy. The capacitors 22 and 24 are electrically coupled to the laser head by the intimate contact between the metallized layer 23 on interior surface of the inner cylindrical capacitor 24 and the metal pressure vessel 28. The pressure vessel 28 contains the gas laser medium 30, which is typically a mixture of carbon dioxide, nitrogen and helium in a 1 to 1 to 8 ratio. The laser medium 30 is bounded by upper and lower transverse discharge electrodes 32 and 34. The upper discharge electrode 32 is electrically and mechanically coupled to the pressure vessel 28 by spring contacts 33. Electrical energy is conveyed to the lower discharge electrode 34 through discharge power feed 35. Power feed support 38 maintains the power feed 35 within the laser head. Power feed connector 36 couples the power feed 35 to the exterior metallized layer 23 of outer capacitor 22 and to the pressure vessel 28 through a charging resistor 52.

The laser resonator cavity 12, which includes a gas chamber 30, is bounded by resonator mirrors 42 and 44. Laser output coupler mirror 42 is held in proper alignment by mirror alignment fixtures 40. Mirror 44 which is held in proper alignment by pressure vessel 28 is a total reflector.

At the top portion of the integrated laser head 10, the spark gap trigger 14 serves as the pulse initiation means in this embodiment of the invention. The trigger includes two internal trigger electrodes 15 and is connected in series between the trigger input wire 16 and an inductor coil 18. The spark gap trigger 14 is a conventional device which is readily available commercially. The spark gap trigger which was employed in the fabrication of the present invention is available from the EG&G Company, Model No. GP20B-33. Inductor coil 18, which is used to match the impedance of the circuit, is typically from 200 to 500 nanohenries in value, and is connected to high voltage electrode 20 which couples the spark gap trigger 14 and the exterior metallized surface of inner cylindrical capacitor 24 as well as the metallized layer 23 between the two capacitors 22 and 24. Return electrode 25 is attached to the exterior of outer cylindrial capacitor 22. Electrode 29 is electrically connected to pressure vessel 28.

Figure 6:
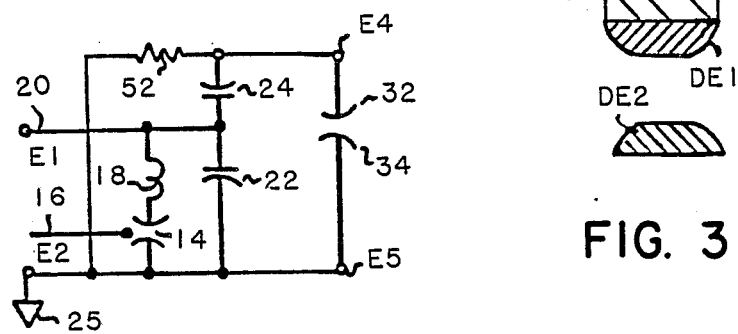
FIG. 6 is a schematic diagram showing the equivalent circuit which constitutes the present invention.

FIG. 6 shows the equivalent electrical circuit which is formed by the above components. The spark gap trigger 14 is connected in parallel with the upper cylindrical capacitor 22 which is in turn connected in series with lower cylindrical capacitor 24. Inductor coil 18 is connected in series between capacitor 22 and spark gap trigger 14.

The schematic shows the upper and lower discharge electrodes 32 and 34 held in place by ceramic insulating material 31 and connected in parallel to the tandem capacitors 22 and 24. The circuit shown in FIG. 6 is normally referred to as an L.C. inverter. The two capacitors $C_1$ and $C_2$ are charged at electrode 20. Upon closing of the circuit by the spark gap 14, the voltage at electrode 32 rises from zero to approximately twice the level at electrode 32 which initiates the discharge in the gas mixture in chamber 30.

Both capacitors 22 and 24 have metallized exterior surfaces 23. All of the exterior surfaces of the capacitors with the exception of their ends are coated with this metallized layer. This preferred embodiment of dual cylindrical ceramic capacitors solves the problem encountered in the prior art by reducing the inductance of the circuit from approximately 250 nanohenries to about 25 nanohenries, an improvement of a full order of magnitude.

Figure 1:
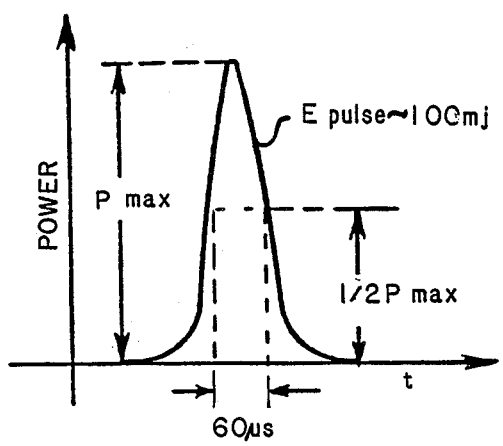
FIG. 1 depicts the ideal waveform which should be generated for use in a laser rangefinder.
Figure 2:
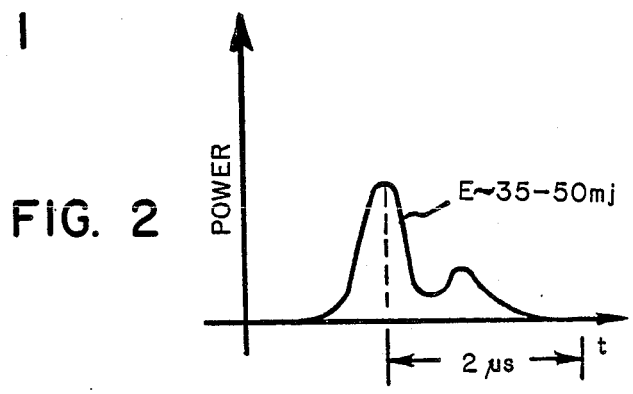
FIG. 2 depicts a typical waveform which is produced by currently available $CO_2$ laser heads which are employed in rangefinder devices.
Figure 7:
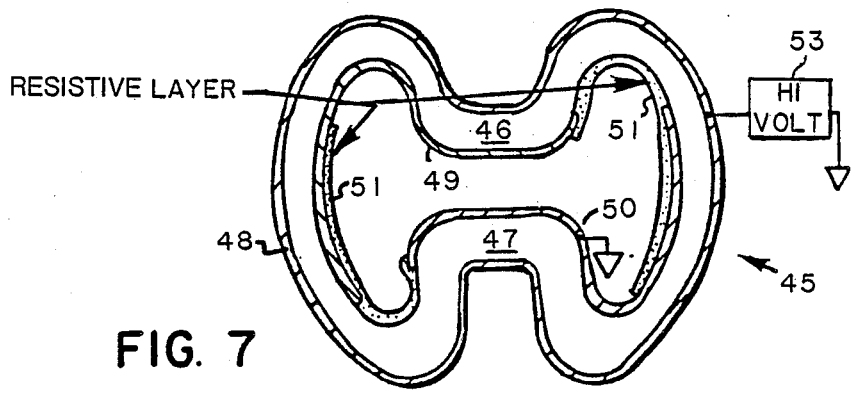
FIG. 7 is an alternative preferred embodiment of the integrated laser head showing a unitary energy storage means and discharge electrode design.

FIG. 7 depicts an alternative preferred embodiment in which the capacitor and discharge electrodes are integrated into one unitary apparatus. The ring-like or toroidal, elongated structure 45 is a single piece of substantially cylindrical ceramic capacitor material including two interior lobe-like projections 46 and 47 each having substantially flat, parallel discharge faces which replace separate discharge electrodes. The exterior surface of the ring like structure is completely coated with a metallized layer 48 which is connected to a source of high voltage 53. The inner projections 46 and 47 are similarly coated with metallized layers 49 and 50 will function as electrodes. The two metallized layers 49 and 50 on the interior surface of the toroidal structure coat the two parallel, facing projections 46 which serve as electrodes and also extend beyond them to opposite interior walls to increase the capacitance of the system. The two electrodes are electrically connected by high resistivity conducting layer 51. Material 51 can be composed of semiconductor material in order to generate pre-ionization discharges. Interior layer 50 is electrically grounded. The coating 51 provides a direct current contact to ground during the charging process of the capacitors. The material 51 then allows the electrodes to become electrically isolated when the L.C. inverter begins the discharging of the capacitors. This alternative embodiment is topologically equivalent to the embodiment described above, and serves to illustrate that the present invention may be practiced in a myriad of forms and variations in order to accomplish any particular set of design contraints.

Although the present invention has been described in detail with reference to a particular preferred embodiment, persons having ordinary skill in the art will appreciate that various modifications and alterations may be made without departing from the spirit and scope of the invention. The preferred embodiment, which is disclosed in detail above, is illustrative as opposed to limitative. The present invention, for example, can be practiced with equally advantageous results in excimer, nitrogen and carbon monoxide as well as any other laser which requires short, high current pulses.

What is claimed is:

1. Integrated self-sustained discharge laser head apparatus for pulsed gas lasers comprising:
   (a) discharge electrode means; and
   (b) energy storage means comprising L.C. inverter means which provides for minimal inductance between said energy storage means and said discharge electrode means said L.C. inverter means delivering energy from said energy storage means to said discharge electrode means, said apparatus having the capacity to operate at internal gas pressures substantially above one atmosphere.

2. Apparatus as claimed in claim 1 in which:
   said energy storage means comprises an annular capacitor.

3. Apparatus as claimed in claim 1 in which:
   said energy storage means comprises a substantially cylindrical capacitor.

4. Apparatus as claimed in claim 1 in which:
   said energy storage means comprises a substantially cylindrical capacitor manufactured from ceramic material.

5. Apparatus as claimed in claim 4 in which:
   said capacitor is formed by coating a plurality of its opposite exterior surfaces with a conductive layer.

6. Apparatus as claimed in claim 5 in which:
   said energy storage means comprises a pair of nested, coaxial, substantially cylindrical ceramic capacitors having coated metallized layers extending lengthwise along each of said nested capacitors for providing electrical contact between the pair of said capacitors;
   said discharge electrode means comprising a plurality of spaced discharge electrodes;
   said capacitors being disposed in an approximately coaxial relationship with the discharge electrode which is connected to a source of high voltage.

7. Apparatus as claimed in claim 6 in which:
   said capacitors are exactly coaxial and longitudinally concentric with the discharge electrode which is connected to a source of high voltage.

8. Apparatus as claimed in claim 1 in which:
   said minimal inductance value between said energy storage means and said discharge electrode means is less than or equal to 25 nanohenries.

9. Apparatus as claimed in claim 1 in which:
   said energy storage means and said discharge electrode means comprises:
   a unitary, elongated toroidal or topologically equivalent structure fabricated from a dielectric material having;
   projections bearing thin conductive layers which serve as both energy storage means and as discharge electrode means for said integrated laser head apparatus;
   one of said projections being electrically grounded;
   said conductive layers further being connected by a pair of overlapping layers of resistive material; and
   said toroidal or topologically equivalent structure further being characterized in that its exterior surface is coated with a conductive layer which is electrically connected to a source of high voltage.

10. Integrated self-sustained discharge laser head apparatus for pulsed gas lasers comprising:
    (a) pulse initiation means;
    (b) energy storage means which provides for minimal inductance between said energy storage means and a plurality of transverse discharge electrodes, and in which said discharge electrodes are located within;
    (c) LC inverter means for delivering energy from said energy storage means to said discharge electrode means;
    (d) laser resonator means including a pressure vessel which further includes a chamber containing a gas laser medium for producing high power laser pulses said apparatus being adapted to operate at internal gas pressures substantially above one atmosphere.

11. Apparatus as claimed in claim 10 in which:
    said pulse initiation means comprises:
    a spark gap trigger connected in series between a power supply and an inductor;
    said inductor further being connected to said energy storage means; and
    a charging resistor connected across said plurality of discharge electrodes.

12. Apparatus as claimed in claim 10 in which:
    said energy storage means comprises an annular capacitor.

13. Apparatus as claimed in claim 10 in which:
    said energy storage means comprises a substantially cylindrical capacitor.

14. Apparatus as claimed in claim 10 in which:
    said energy storage means comprises a substantially cylindrical capacitor manufactured from ceramic material.

15. Apparatus as claimed in claim 14 in which:
    said capacitor is formed by coating a plurality of its opposite exterior surfaces with a conductive layer.

16. Apparatus as claimed in claim 14 in which:
    said energy storage means comprises a pair of nested, coaxial substantially cylindrical ceramic capacitors having coated metallized layers extending lengthwise along each of said nested capacitors for providing electrical contact between the pair of said capacitors;

said discharge electrode means comprises a plurality of spaced discharge electrodes including a high voltage electrode and a grounded electrode; and in which said capacitors are disposed in an approximately coaxial relationship with said high voltage electrode which is connected to said pulse initiation means which is connected to a source of high voltage; and said capacitors further being disposed to substantially enclose said grounded discharge electrode.

17. Apparatus as claimed in claim 16 in which:

said capacitors are exactly coaxial and longitudinally concentric with the discharge electrode which is connected to the side of said pulse initiation means which produces high voltage.

18. Apparatus as claimed in claim 10 in which:

said laser resonator means comprises:

an output coupling mirror and a totally reflective mirror which reside near the respective longitudinal ends of said pressure vessel which includes said chamber which is filled with a pressurized gas mixture.

19. Apparatus as claimed in claim 18 in which:

said gas mixture comprises carbon dioxide nitrogen, and helium in a 1 to 1 to 8 ratio respectively.

20. Apparatus as claimed in claim 16 in which:

said discharge electrode is mechanically and electrically coupled to said pressure vessel by means of conductive spring clips integrally formed on said electrode.

21. Apparatus as claimed in claim 10 in which:

said minimal inductance value between said energy storage means and said discharge electrode means is less than or equal to 25 nanohenries.

22. Apparatus as claimed in claim 10 in which:

said energy storage means comprises:

a unitary, elongated toroidal or topologically equivalent structure;

including first and second facing interior projections;

both the first and second projections bearing thin conductive layers which serve as both energy storage means and as said transverse discharge electrodes for said apparatus;

one of said projections being electrically grounded;

said conductive layers being further characterized in that they extend beyond said facing of said projections so that they are disposed on substantially opposite sides of the interior of said toroidal or topologically equivalent structure;

said conductive layers further being connected by a pair of overlapping layers of resistive material; and said torodial or topologically equivalent structure further being characterized in that its exterior surface is coated with a conductive layer which is electrically connected to a source of high voltage.

23. Apparatus as claimed in claim 10 in which said energy storage means and said discharge electrode means comprise a unitary, elongated, toroidal or topologically equivalent dielectric structure having projections bearing conductive layers which serve as both energy storage means and as discharge electrode means for said apparatus;

one of said projections being electrically grounded;

said conductive layers being connected by resistive material; and said toroidal or topologically equivalent structure having an exterior conductive layer which is electrically connected to a source of high voltage.

* * * * *